United States Patent
Rudenko et al.

(10) Patent No.: US 11,374,447 B2
(45) Date of Patent: Jun. 28, 2022

(54) HYBRID ROTOR FOR AN AXIAL FLUX ELECTRICAL MACHINE

(71) Applicant: Rolls-Royce Deutschland Ltd & Co KG, Blankenfelde-Mahlow (DE)

(72) Inventors: Anton Rudenko, Ottobrunn (DE); Stefan Biser, Munich (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 223 days.

(21) Appl. No.: 16/747,247

(22) Filed: Jan. 20, 2020

(65) Prior Publication Data

US 2020/0235618 A1 Jul. 23, 2020

(30) Foreign Application Priority Data

Jan. 22, 2019 (EP) .................... 19152999

(51) Int. Cl.
| | |
|---|---|
| *H02K 1/24* | (2006.01) |
| *B64D 27/02* | (2006.01) |
| *B64D 27/24* | (2006.01) |
| *H02K 16/04* | (2006.01) |
| *H02K 19/10* | (2006.01) |

(52) U.S. Cl.
CPC ............ *H02K 1/246* (2013.01); *B64D 27/02* (2013.01); *B64D 27/24* (2013.01); *H02K 16/04* (2013.01); *H02K 19/103* (2013.01); *B64D 2027/026* (2013.01)

(58) Field of Classification Search
CPC ...... H02K 1/246; H02K 16/04; H02K 19/103; B64D 27/02; B64D 27/24; B64D 2027/026

USPC .......................................... 310/269
See application file for complete search history.

(56) References Cited

U.S. PATENT DOCUMENTS

| | | | |
|---|---|---|---|
| 6,803,694 B2 | 10/2004 | Decristofaro et al. | |
| 2010/0148611 A1 | 6/2010 | Wang et al. | |
| 2017/0338707 A1* | 11/2017 | Shono | H02K 1/2766 |

FOREIGN PATENT DOCUMENTS

| | | | | |
|---|---|---|---|---|
| FR | 3059169 A1 | | 5/2018 | |
| RU | 2589212-02 | * | 7/2016 | ............ B64D 27/24 |
| WO | 2010007385 A2 | | 1/2010 | |

OTHER PUBLICATIONS https://www.engineeringtoolbox.com/permeability-d_1923.html (Year: 2021).*

(Continued)

*Primary Examiner* — Terrance L Kenerly
(74) *Attorney, Agent, or Firm* — Shuttleworth & Ingersoll, PLC; Timothy J. Klima

(57) ABSTRACT

The present invention provides a rotor, an axial flux electrical machine and a hybrid-electrical or electrical air craft. The rotor for the axial flux electrical machine comprises first sections of a first material and second sections of a second material. The first sections and second sections are arranged in alternating order and ring-shape. The arrangement is characterized by third sections which form interface areas between the first sections and second sections, whereas the third sections are comprising the first material and the second material in such a manner that the first section and the second section are connected force-fitted.

12 Claims, 3 Drawing Sheets

(56) References Cited

OTHER PUBLICATIONS

Madhavan et al: "Axial Flux Segmented A SRM with a higher number of rotor segments for electric vehicles", IEEE Transactions on energy conversion, IEEE Service Center, Piscataway, NJ, US, vol. 28, No. 1, Mar. 1, 2013 (Mar. 1, 2013), pp. 203-213, XP011493445, ISSN: 0885-8969, DOI: 10.1109/TEC.2012 2235068, abstract.
The Journal Paper "Design and Testing of a Carbon-Fiber-Wrapped Synchronous Reluctance Traction Motor" (2018) by Kevin Grace et. al. in "IEEE Transactions On Industry Applications".
European Search Report dated Jul. 24, 2019 from counterpart European App No. 19152999.9.

* cited by examiner

HYBRID ROTOR FOR AN AXIAL FLUX ELECTRICAL MACHINE

This application claims priority to European Patent Application EP19152999.9 filed Jan. 22, 2019, the entirety of which is incorporated by reference herein.

FIELD OF THE INVENTION

The present invention relates to a rotor, an axial flux electrical machine, and a hybrid-electrical or electrical aircraft.

BACKGROUND OF THE INVENTION

An electrical machine transforms electrical energy into mechanical energy or vice versa, basing its principle of operation on the electromagnetic interactions of magnetic fields generated by coils, housed in a structure. Electrical machines are usually composed of at least one stator and at least one rotor.

Typically, electric machines are designed and constructed to use the radial flux distribution, where rotor and stator have a small radial air gap between them. In axial flux electric machines, the winding can vary their geometric arrangement according to the required design diameter, making it possible to considerably reduce the total volume occupied by the machine.

Axial flux electric machines have specific positioning of their magnets, which are in planes parallel to the coils, which allows to create a flux of magnetic field over a smaller rotary volume resulting in a decrease of the moment of inertia and the mass of the rotor.

Axial flux electric machines improve efficiency, size, reliability and cost-effectiveness versus the current generation of direct drive machines (radial flux electric machines).

The structural and electromagnetic problems related to a high-speed, reluctance-based, axial flux rotor design, particularly in the bridge regions between the poles are the high stress concentration due to centrifugal forces in the bridges between the pole segments, which limits the maximum speed. This problem can be encountered by a thicker bridge between the poles. Increasing the bridge thickness, however, also reduces the structural loads but also makes it a better flux carrier and thus reduces the difference in reluctance between the poles and the pole gaps and subsequently the power of the machine.

The Journal Paper "Design and Testing of a Carbon-Fiber-Wrapped Synchronous Reluctance Traction Motor" (2018) by Kevin Grace et. al. in "IEEE TRANSACTIONS ON INDUSTRY APPLICATIONS" addresses a similar problem for a radial-flux reluctance machine by wrapping the rotor with a carbon fiber reinforced plastic material. This approach helps to reduce bridges between the poles but not to eliminate them completely and is also limited by the strength of a relative thin carbon fiber reinforced plastic sleeve.

U.S. Pat. No. 6,803,694 B2 presents a rotor made by high-strength amorphous metals but provides no solution for a high-speed application.

SUMMARY OF THE INVENTION

The object of the invention is to improve the state of the art of rotor design for axial flux reluctance-based electric machines.

To accomplish the objective, the present invention provides a rotor, an axial flux electrical machine, and a hybrid-electrical or electrical air plane. The invention is given by the features of the independent claims.

Advantageous embodiments are provided in the dependent claims. Further features, application possibilities, and advantages of the invention result from the following description.

According to the invention the objective is accomplished by a rotor comprising a first material with high magnetic permeability and a second material with low magnetic permeability which are arranged in alternating order with an interface area of both materials in between.

The invention claims a rotor of an axial flux electrical machine, comprising first sections of a first material and second sections of a second material whereas the first sections and second sections are arranged in alternating order and ring-shape. The rotor is characterized by third sections which form interface areas or overlapping zone between the first and second sections, whereas the third sections are comprising the first material and the second material in such a way that the first section and the second section are connected force-fitted.

According to a further embodiment of the rotor, the first material has a maximum magnetic permeability $\mu_r$ higher than $10^4$ $Hm^{-1}$ and the second material has a magnetic permeability $\mu_r$ under $10^1$ $Hm^{-1}$.

According to a further embodiment of the rotor, the first material is an amorphous metal with a high tensile strength ($\sigma_{max}$) over 1 GPa. This has the advantage of a high structural strength of the material.

According to a further embodiment of the rotor, the second material is a structured material with a tensile strength $\sigma_{max}$ over 1 GPa. The second material can be for example carbon fibre reinforced plastic (CFRP) or any "thin ply" composite. This has the advantage of a high structural strength of the material and low magnetic permeability.

According to a further embodiment of the rotor, the tensile strength $\sigma_{max}$ and tensile modulus Ey of the first material and the second material differ by less than 20%. This results in mechanical properties of the first material which are similar to/located in the near field of the mechanical properties (e.g.: thermal extension coefficient and Young modulus) of the second material.

According to a further embodiment of the rotor, the first material is arranged in the first sections in ribbon-like stripes, which form magnetic rotor poles, the second material in the second sections forms pole gaps, and the first material and the second material are arranged in interleaved laminations or layers/plies in the third sections.

The ribbon-like stripes of the first section can be separated by layers of non-conductive adhesive The second section serves to ensure the difference in reluctance resulting in a higher possible machine torque due to an increased saliency ratio and a higher possible operational speed, resulting in a higher power density of the machine. The rotor weight can be reduced by application of lightweight materials in the second sections, which can form pole gaps.

The third sections serve to provide enough contact surface for a frictionally engaged connection to sustain tangential loads, which are induced by centrifugal forces at high rotational speed. The third section further serves as load carrying, low-permeable structure between the poles and pole gaps/first sections and second sections, with a frictionally engaged connection to the pole material and the pole gap material/the first material and the second material by interleave material slices. The torque ripple can be addressed by tailoring the magnetic properties in the interface area.

The present invention further claims an axial flux electrical machines with a rotor according to the invention. This has the advantage of a more power dense electrical machines, working at speeds harder to otherwise achieve with conventional solutions. Further, the amorphous metal mass can be reduced at higher machine power, which results in lower material costs.

According to a further embodiment the axial flux electrical machines is a reluctance-based machine.

The present invention further claims a hybrid-electrical or electrical air plane with an axial flux electrical machine according to the invention. Other applications wherever a high-power density is critical, e.g. in maritime or automotive industry are possible.

According to a further embodiment the aircraft is an air plane.

Further benefits and advantages of the present invention will become apparent after a careful reading of the detailed description with appropriate reference to the accompanying drawings.

DETAILED DESCRIPTION OF THE INVENTION

Figure 1:
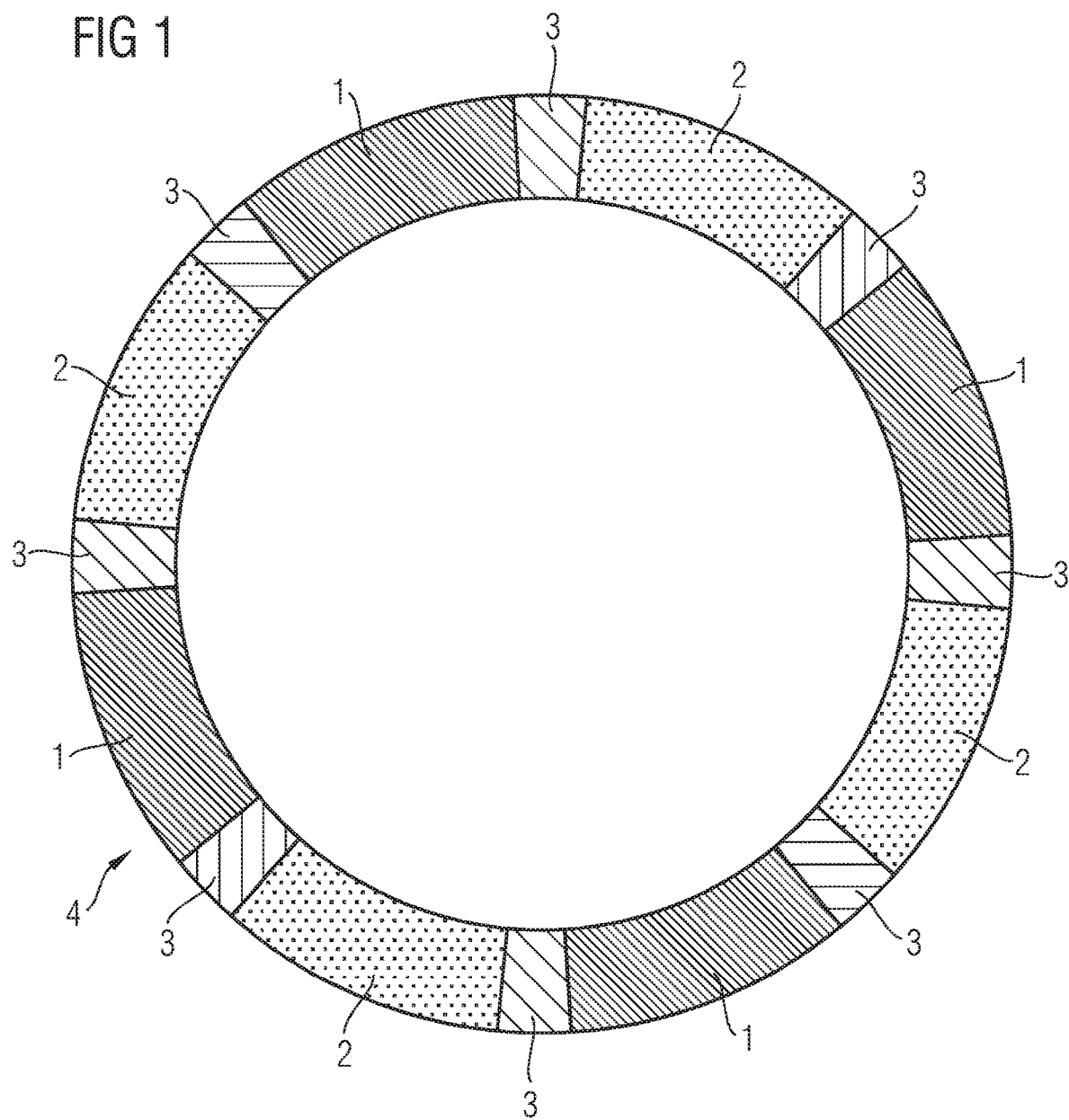
FIG. 1 shows a frontal view of a rotor.

FIG. 1 shows a rotor 4 with first sections 1, second sections 2, and third sections 3. The first sections 1 consists of a first material, the second sections 2 consists of a second material, and the third sections 3 consist of the first and the second material in such a way that the first section and the second section are connected force-fitted. The first sections 1 and second sections 2 are arranged in alternating order and ring-shape. The third sections 3 form interface areas or overlapping zone between the first section 1 and second sections 2.

The first material has a high magnetic permeability $\mu_r$ (in the range of $10^5$, but higher than $10^4$ Hm$^{-1}$) and the second material has a low magnetic permeability $\mu_r$ (in the range of 1, but under $10^1$ Hm$^{-1}$). Further, the first material is an amorphous metal with a tensile strength ($\sigma_{max}$) over 1 GPa. This has the advantage of a high structural strength of the material.

The second material is a structured material with a tensile strength $\sigma_{max}$ over 1 GPa. The second material can be for example carbon fibre reinforced plastic (CFRP) or any "thin ply" composite. This has the advantage of a high structural strength of the material and no ferro-magnetism.

The first material is arranged in the first sections in ribbon-like stripes, which form magnetic rotor poles, the second material in the second sections form pole gaps, and the first material and the second material are arranged in interleaved laminations or layers/plies in the third sections.

Figure 2:
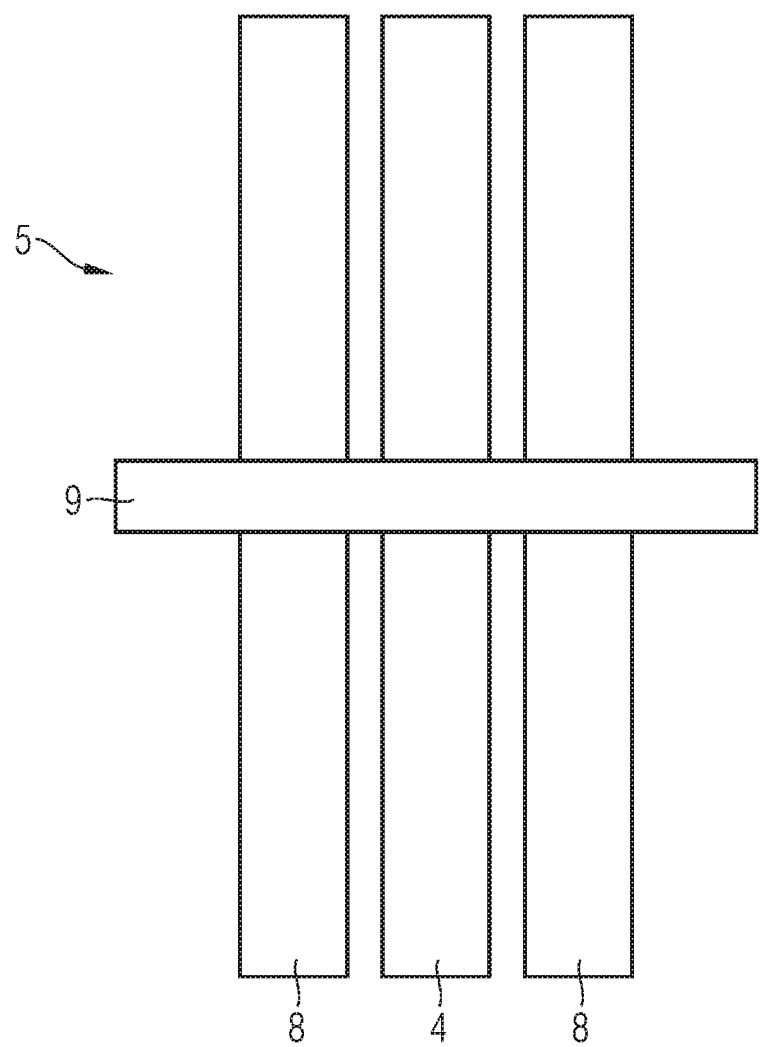
FIG. 2 shows a cross-sectional side view of a reluctance-based electrical machine and
FIG. 3 shows an air plane with an electrical machine.

FIG. 2 shows a reluctance-based machine 5 with a rotor 4, two stators 8 and a rotation axis 9. The rotor 4 is arranged between the two stators 8 and rotates around the axis 9. The rotor is made up according to the design of FIG. 1

Figure 3:
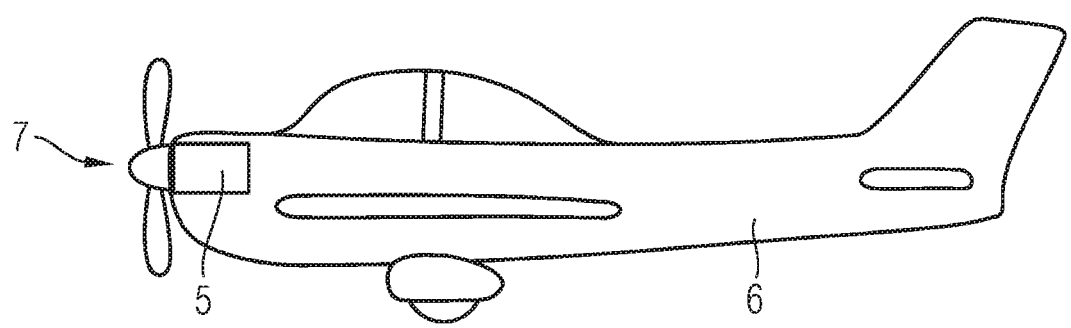

FIG. 3 shows an air plane 6 with a reluctance-based electrical machine 5 according to FIG. 2, as an example of an electrical machine. The electrical machine 5 drives a propeller 7. The air plane 6 is an example for an aircraft.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. An axial flux electrical machine, comprising:
a stationary stator,
a rotor rotatably mounted with respect to the stator and configured to rotate around an axis, the rotor comprising:
first sections of a first material, and
second sections of a second material,
wherein the first sections and second sections are arranged in alternating order and ring-shaped,
third sections circumferentially positioned between the first sections and the second sections to form circumferential interface areas between the first sections and second sections, wherein the third sections comprise both the first material and the second material overlapping one another in a circumferential direction and in such a manner that the first sections and the second sections are connected force-fitted.
2. The axial flux electrical machine according to claim 1, wherein the first material has a magnetic permeability higher than $10^4$ Hm$^{-1}$ and the second material has a magnetic permeability under $10^1$ Hm$^{-1}$.
3. The axial flux electrical machine according to claim 1, wherein the first material is an amorphous metal with a tensile strength over 1 GPa.
4. The axial flux electrical machine according to claim 1, wherein the second material is a structured material with a tensile strength over 1 GPa.
5. The axial flux electrical machine according to claim 1, wherein respective tensile strengths and tensile moduli of the first material and the second material differ by less than 20%.
6. The axial flux electrical machine according to claim 1, wherein:
the first material is arranged in the first sections in ribbon stripes, which form magnetic rotor poles,
the second material in the second sections form pole gaps, and
the first material and the second material are arranged in interleaved laminations in the third sections.
7. The axial flux electrical machine according to claim 1, wherein the axial flux electrical machine is a reluctance-based machine.
8. A hybrid-electrical or electrical aircraft with the axial flux electrical machine according to claim 1.
9. The aircraft according to claim 8, wherein the aircraft is an airplane.
10. The axial flux electrical machine according to claim 1, wherein the first sections and second sections are arranged in a circumferentially alternating order around a ring at a same radius from the axis.
11. A rotor for an axial flux electrical machine, comprising:
first sections of a first material, and
second sections of a second material,
wherein the first sections and second sections are arranged in alternating order and ring-shaped, third sections which form interface areas between the first sections and second sections, whereas the third sections comprise the first material and the second material in such a manner that the first section and the second section are connected force-fitted, wherein respective tensile strengths and tensile moduli of the first material and the second material differ by less than 20%.

12. A rotor for an axial flux electrical machine, comprising:

first sections of a first material, and second sections of a second material, wherein the first sections and second sections are arranged in alternating order and ring-shaped, third sections which form interface areas between the first sections and second sections, whereas the third sections comprise the first material and the second material in such a manner that the first section and the second section are connected force-fitted, wherein:

the first material is arranged in the first sections in ribbon stripes, which form magnetic rotor poles, the second material in the second sections form pole gaps, and the first material and the second material are arranged in interleaved laminations in the third sections.

* * * * *